2,770,641
PREPARATION OF BENZONITRILE

Charles H. McKeever, Meadowbrook, and Joseph W. Nemec, Philadelphia, Pa., assignors to Rohm & Haas Company, Philadelphia, Pa., a corporation of Delaware No Drawing. Application August 13, 1954,
Serial No. 449,784

2 Claims. (Cl. 260—465)

This invention deals with a process for preparing benzonitrile. According to this invention this compound is prepared from benzoic acid and ammonia in liquid phase with removal of both benzonitrile and water formed during reaction under conditions which will be fully set forth below.

Benzonitrile has been prepared by reacting toluene and ammonia in gaseous phase at high temperatures. It is desirable, however, to avoid such temperatures and it would be simpler to work in liquid phase. Attempts have been made to prepare benzamide and convert this to the nitrile, as in the presence of acid anhydride or aluminum chloride. Yields are not always favorable in such methods and the product often lacks the qualities essential for its successful use as in the conversion to benzoguanamine and formation of resins therefrom. Impurities which act as inhibitors and which are otherwise objectionable are very difficult to remove. There is thus a real need of an efficient method for preparing benzonitrile of high purity.

We have discovered a method for producing benzonitrile in a high yield and of high quality. Our prime reactants are benzoic acid and ammonia. These are supplied to a reactor wherein benzonitrile, which may have been previously formed by any desired method, together with a catalyst, is being heated under reflux. As benzoic acid is added, the temperature of the mixture in the reactor is advanced until the temperature thereof is in the range of 200° to 250° C., preferably 225° to 245° C. At the same time vapors from the reaction zone of the apparatus are passed through a fractionating zone to a condensing zone, where benzonitrile and water are condensed with reflux. When equilibrium conditions are reached, the temperature at the head of the fractionating zone is between 125° and 175° C., preferably 150°–170° C. Benzonitrile and water are then withdrawn at partial take-off, reflux being maintained at a ratio sufficient to maintain temperatures within the above-stated ranges.

The process thus becomes continuous, if so desired. Benzoic acid and ammonia are continuously fed to the reactor, while benzonitrile and water are taken off. Occasionally small additions of catalyst may be necessary to keep the rate of production at a desired high level. At the optimum conditions of operation the temperature in the reactor is held at 240±5° C. while the overhead temperature is maintained at 155°±5° C. Rates of addition of benzoic acid and removal of product and heating and cooling are adjusted to maintain these temperatures.

As an alternative means for starting the process, the reaction zone may be partially charged with an inert organic solvent, boiling from about 125° to about 180° C., such as xylene or a high boiling naphtha. The solvent is heated to reflux, whereupon benzoic acid and excess ammonia are introduced. These react in the presence of a catalyst with formation of benzonitrile. As the process is continued, the reflux becomes more and more a mixture of benzonitrile and water. Solvent is, of course, taken off together with an increasing proportion of benzonitrile. The first runnings can be fractionated to give the desired product free of solvent. This start-up method is of convenience in the lack of benzonitrile, but is essentially equivalent to the procedure above described.

When it is desired to shut down the operation, addition of benzoic acid is discontinued but flow of ammonia is continued at gradually decreasing rates. Product is taken off until the volume in the reactor is small, for example, 10%. The head temperature tends to increase to about 185° C. and the temperature in the reactor to about 300° C.

Residue from the reactor is mostly recoverable. It is conveniently drawn off, allowed to cool, and crushed to a finely divided state. The powdered material is heated with excess of aqueous 10% sodium hydroxide solution. A period of six to ten hours can be allowed for this operation. The mixture is cooled and filtered. The basic filtrate is acidified, as with hydrochloric or sulfuric acid, and filtered to remove benzoic acid. The filtered solid is treated to recover the catalyst. Usually the solid can be treated with nitric acid and washed with water to give a reusable catalyst. It may be noted that since the process can be operated over considerable periods of time, recovery of materials from the residue is not essential to the economies of the process. Hence, if desired, the residue may be discarded.

The condensate which is taken off consists of benzonitrile and water. Addition of about 2% of salt to the condensate may help in the separation of nitrile and water. The aqueous layer may be discarded. The organic layer still contains about one percent of water, which is removable by heating, conveniently under reduced pressure. This layer may also be treated with a drying agent and filtered. The product is quite pure benzonitrile.

Adition of salt as above noted is not essential, as the water contains ammonia from the excess used and this by itself is often sufficient by itself to give a good, clean separation of phases. If desired, the excess ammonia can be recovered and recycled. This is not, however, essential since this process without recovery of excess is already highly economical.

As catalyst for promoting and accelerating the reaction to form benzonitrile there is preferably used molybdenum oxide. Molybdic acid or ammonium molybdate, technical or reagent quality, may likewise be used. Other catalysts which improve the rate of reaction are tungstic acid, molybdenum-alumina catalysts, cobalt oxide, cobalt acetate, chromia on titania, chromia on zirconia, cobalt on zirconia, vanadium pentoxide, and the like. An active catalyst, metal or metal oxide, may be extended or supported on a carrier such as zirconia, titania, or alumina, or it may be promoted with a second metal, its salt or its oxide, such as cerium, thorium, zinc, magnesium, beryllium, or zinc.

Yields by our process are excellent, being in excess of 95% based on benzoic acid. No noticeable by-products are present in the benzonitrile obtained. The benzonitrile as obtained is so pure that no distillation is needed.

We have found that an excess of ammonia over the benzoic acid is necessary for efficient operation. Ammonia may be used directly from commercial cylinders. Ratios from 1.2/1 to 1.8/1 of moles of ammonia to moles of benzoic acid appear to be optimum, since the best production rates ensue, but the process is successfully carried out with more or less ammonia. While we have operated with close to the theoretical ratio, production rates have been then found to be relatively slow.

While it is desirable to use fairly pure benzoic acid as a matter of principle, this is not essential for the successful operation of our process. Any good grade of this acid can be used. Even material containing traces of inorganic material can be used, these accumulating in the residue. The benzoic acid may be introduced readily in liquid form from a preheater, this acid melting at 122° C. It may also be fed as a solid.

The exact nature and the size of the reactor are not critical factors. More important considerations are the heat transfer arrangements for supplying heat to the reaction zone and for condensing the vapors. These are important factors in determining rate of production. They must, however, be related to the efficiency of fractionation. The balance of these factors is accurately defined by reference to the temperature of the materials in the reaction zone and at the head of the fractionating zone.

We have observed that in order to maintain these two temperatures within the stated ranges at a good rate of production of benzonitrile, the fractionating zone should have the equivalent of at least four theoretical plates. More seems desirable as rate is increased. With eight or more theoretical plates rate of production can be relatively high. The fractionating zone may be packed or it may utilize plates in a column. The important factor is that only benzonitrile and water and the excess NH3 be obtained at the head of this zone.

The temperatures stated are for a system operating with the condensing zone at normal atmospheric pressure. Adjustments in temperatures can be made if pressures are reduced or increased. Increased pressures are evidently advantageous because they increase the solubility of ammonia in the system and, therefore, promote higher utilization of ammonia.

Further details of the process of this invention will be found in the following illustrative example. Parts therein are by weight.

*Example I*

A reaction system was constructed having a reaction pot directly connected to a short column filled with packing which in turn was connected to a condenser equipped with a partial take-off device. The reaction pot contained an efficient stirrer and tubes for bringing a stream of ammonia gas and liquid benzoic acid from a preheater where it could be melted. There was placed in the pot 400 parts of benzonitrile and 50 parts of molybdenum oxide powder. This mixture was stirred and heated until reflux was occurring freely. Addition was then begun of molten benzoic acid. Flow of ammonia was started at the rate of 0.5 part per minute, the rate being increased later to about 45 parts per hour. The rate of flow of benzoic acid was brought to 207 parts per hour. By this time the reaction temperature had been raised to 240° C. and was there maintained and the head temperature reached about 160° C. When a steady state was reached benzonitrile and water were removed at partial take-off. After 40 hours and again after 95 hours of operation, 35 part portions of catalyst were added. When it was decided to discontinue operation, the supply of benzoic acid was shut off. The reactor temperature was raised to 290° C.; the head temperature was carried to 180° C. The operation was discontinued after a total time of 130 hours. At this time there had been fed 5824 parts of ammonia and 26,572 parts of benzoic acid.

The mixture of benzonitrile and water was resolved by adding thereto sodium chloride in an amount of 2% of the mixture, which contained about 26% of water. Layers formed and were separated. The benzonitrile layer was treated with calcium chloride and filtered. The yield was 21,328 parts of pure benzonitrile. About 300 parts of benzonitrile were recoverable from treating apparatus and drying agent.

The residue was taken from the reaction pot and treated with aqueous 10% sodium hydroxide solution for eight hours under reflux. This mixture was filtered. The filtrate was cooled and acidified with hydrochloric acid. Benzoic acid separated out, was filtered off, was washed, and dried. It amounted to 476 parts.

The adjusted yield of benzonitrile was 96.4%.

We claim:

1. A process for preparing benzonitrile which comprises charging to a reaction zone in a reaction system benzonitrile in an amount to fill a fraction of said zone, supplying to said zone a dehydration catalyst, heating the charged benzonitrile until vapors thereof pass through a fractionating zone to a condensing zone where the vapors are condensed with reflux of benzonitrile, passing into the reaction zone benzoic acid and ammonia in molecular excess of the said acid while maintaining reflux of the benzonitrile, heating the reaction zone until the contents thereof are between 200° and 250° C. and the vapor temperatures at the head of the fractionating zone are maintained between 125° and 175° C. while addition of benzoic acid and ammonia is continued, taking off benzonitrile and water while maintaining reflux of benzonitrile and water.

2. A process for preparing benzonitrile which comprises charging to a reaction zone in a reaction system benzonitrile in an amount to fill 5% to 20% of said zone, supplying to said zone molybdenum oxide as a dehydration catalyst, heating the charged benzonitrile until vapors thereof pass through a fractionating zone to a condensing zone where the vapors are condensed with reflux, passing into the reaction zone benzoic acid and ammonia in molecular excess of the said acid while maintaining reflux of the benzonitrile, heating the reaction zone containing the mixture of benzonitrile, benzoic acid and ammonia and maintaining the mixture therein at 225° to 245° C. and the vapor temperatures at the head of the fractionating zone at 150° to 170° C., condensing benzonitrile and water in the condensing zone, taking off benzonitrile and water and at the same time returning benzonitrile and water to help maintain temperatures of 150° to 170° C. at the head, and continuing addition of benzoic acid and ammonia and withdrawal of benzonitrile and water.

References Cited in the file of this patent

UNITED STATES PATENTS

| | | |
|---|---|---|
| 2,100,401 | Linstead et al. | Nov. 30, 1947 |
| 2,591,493 | Arnold et al. | Apr. 1, 1952 |

OTHER REFERENCES

Mitchell et al.: J. Am. Chem. Soc. vol. 53, p. 329 (1931).